United States Patent [19]
Matic, Jr.

[11] Patent Number: 5,788,134
[45] Date of Patent: Aug. 4, 1998

US005788134A

[54] LIQUID CARRYING APPARATUS FOR BICYCLE

[76] Inventor: Thomas Matic, Jr., 1141 SE. 72nd Ave., Portland, Oreg. 97215

[21] Appl. No.: 602,252

[22] Filed: Feb. 15, 1996

[51] Int. Cl.$^6$ ........................................ B62J 11/00
[52] U.S. Cl. ................ 224/414; 224/426; 224/435; 224/463; 294/25
[58] Field of Search ................ 224/414, 426, 224/435, 148.2, 463; 222/610; 280/288.4

[56] References Cited

U.S. PATENT DOCUMENTS

| | | |
|---|---|---|
| 581,568 | 4/1897 | Wilde ........................ 224/448 |
| 585,833 | 7/1897 | Reznick ...................... 224/463 |
| 596,998 | 1/1898 | Hawkins et al. ............. 224/414 |
| 2,915,222 | 12/1959 | Purinton . |
| 3,677,446 | 7/1972 | Guyer et al. . |
| 3,992,706 | 11/1976 | Tunney et al. . |
| 4,095,812 | 6/1978 | Rowe . |
| 4,159,790 | 7/1979 | Bailey . |
| 4,274,566 | 6/1981 | Rowe . |
| 4,284,209 | 8/1981 | Barbour . |
| 4,345,704 | 8/1982 | Boughton . |
| 4,386,721 | 6/1983 | Shimano . |
| 4,420,097 | 12/1983 | Motsenbocker . |
| 4,441,638 | 4/1984 | Shimano . |
| 4,544,087 | 10/1985 | Modig . |
| 4,629,098 | 12/1986 | Eger . |
| 4,739,905 | 4/1988 | Nelson . |
| 4,807,813 | 2/1989 | Coleman . |
| 4,815,635 | 3/1989 | Porter . |
| 4,830,240 | 5/1989 | Tackles et al. . |
| 4,852,781 | 8/1989 | Shumick et al. . |
| 4,883,105 | 11/1989 | Saelens et al. . |
| 4,886,176 | 12/1989 | Steakley . |
| 4,911,339 | 3/1990 | Cushing . |
| 4,948,023 | 8/1990 | Tripp . |
| 5,024,358 | 6/1991 | Reichert et al. . |
| 5,062,591 | 11/1991 | Runkel . |
| 5,115,952 | 5/1992 | Jenkins ........................ 224/435 |
| 5,119,978 | 6/1992 | Kalamaras et al. . |
| 5,158,218 | 10/1992 | Wery . |
| 5,215,231 | 6/1993 | Paczonay . |
| 5,251,777 | 10/1993 | McMahon ..................... 224/448 |
| 5,301,858 | 4/1994 | Hollander . |
| 5,301,860 | 4/1994 | Paczonay . |
| 5,358,142 | 10/1994 | Holmes . |
| 5,419,154 | 5/1995 | Christoff ....................... 224/448 |

FOREIGN PATENT DOCUMENTS

| | | | |
|---|---|---|---|
| 2685278 | 6/1993 | France ...................... 280/288.4 |
| 14597 | of 1909 | United Kingdom ............ 224/35 |

*Primary Examiner*—Linda J. Sholl
*Attorney, Agent, or Firm*—Kolisch Hartwell Dickinson McCormack & Heuser

[57] ABSTRACT

A liquid carrying apparatus for use on a bicycle frame, the frame having a base and first and second frame members operatively interconnected adjacent the base, the apparatus comprising a liquid holding tank including frame-member-confronting sides, the tank designed to be directly anchored to the first and second frame members. The tank is operatively connected to a hose. The base includes a hose holder that grips the hose adjacent its said second end, the holder having a user manipulable handle sized to receive and encircle a finger of a rider's hand, and a handlebar clasp which is oriented so as to be removably attachable to the handlebar.

20 Claims, 4 Drawing Sheets

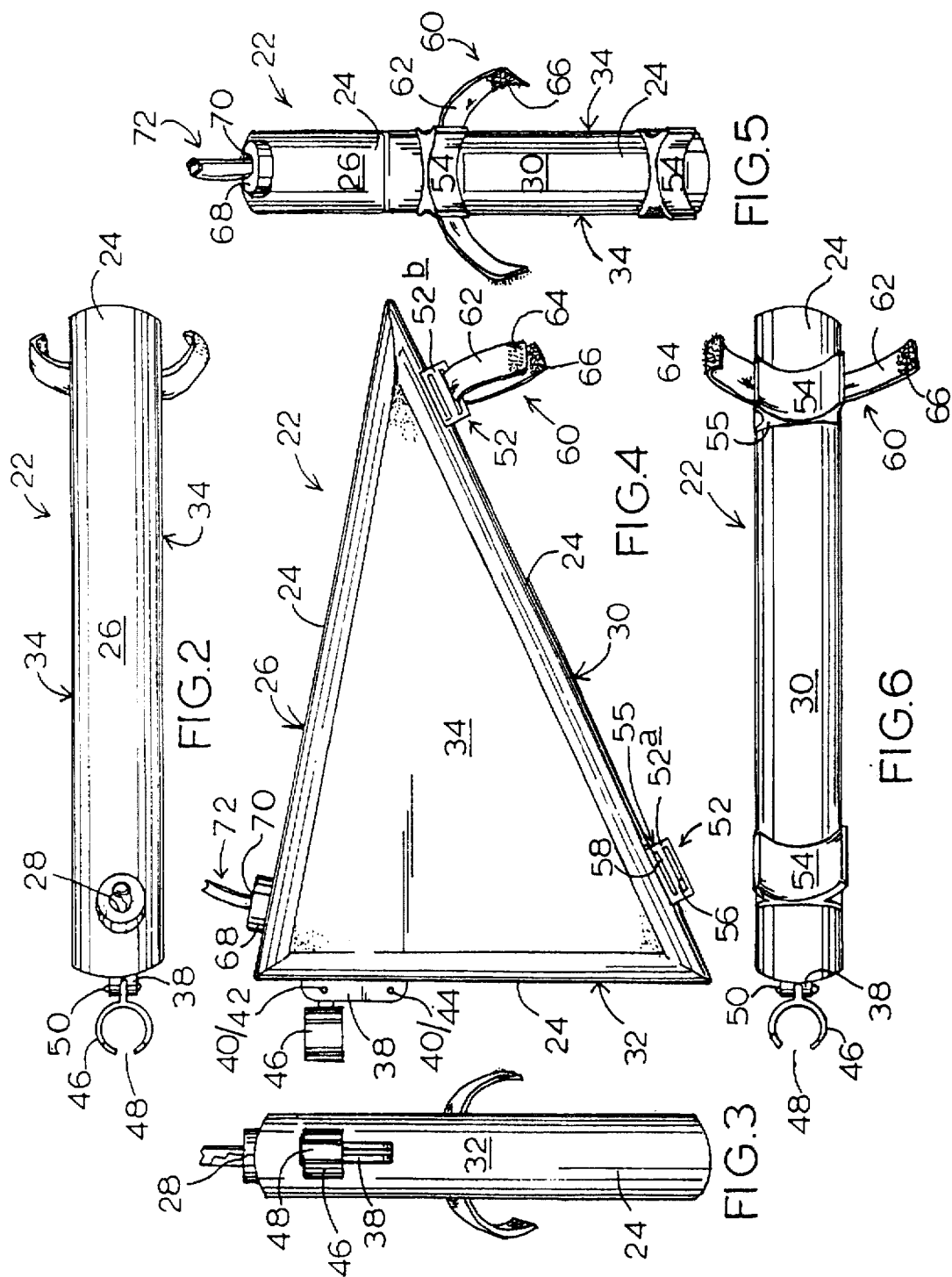

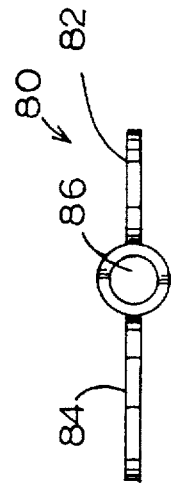
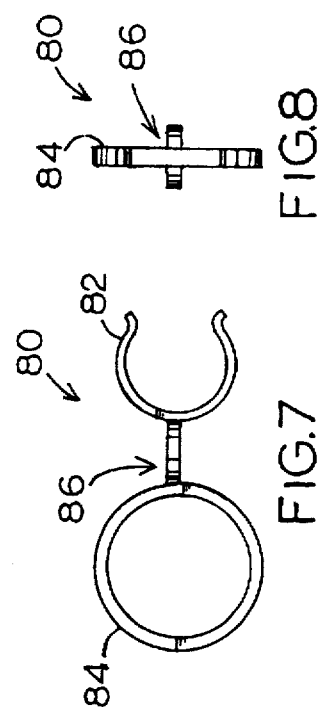
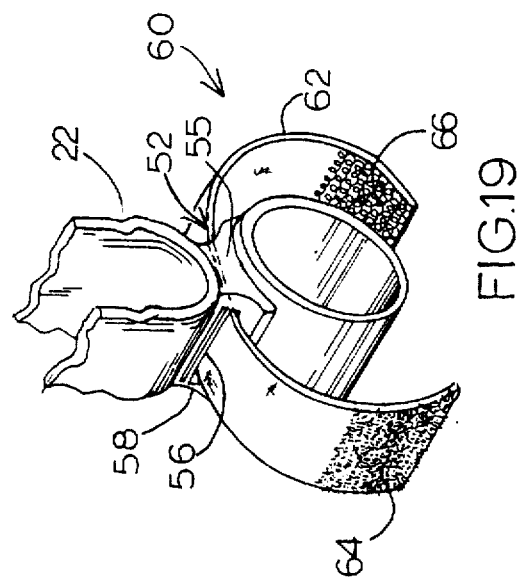
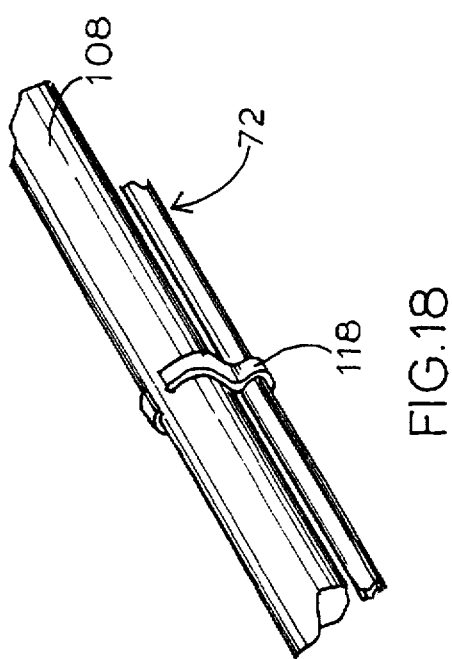

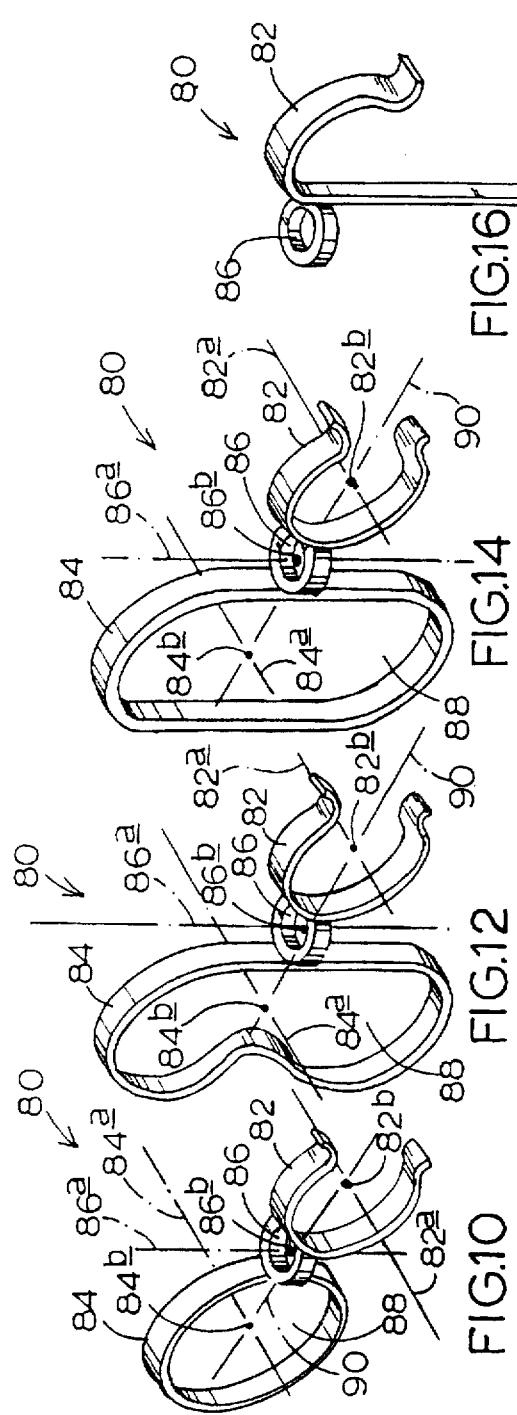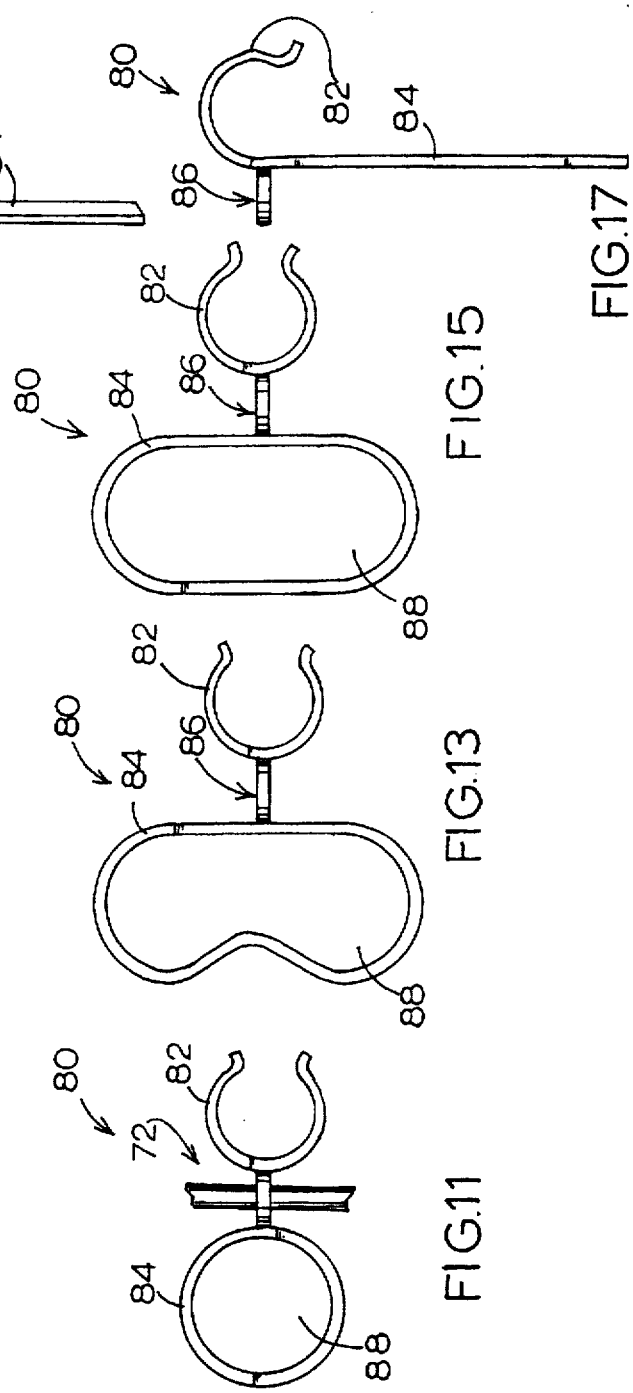

LIQUID CARRYING APPARATUS FOR BICYCLE

FIELD OF INVENTION

This invention relates generally to an apparatus for storing liquid, and more particularly to a bicycle mounted liquid tank for providing liquid to a bicycle rider.

BACKGROUND ART

A liquid carrying apparatus for use on a bicycle usually consists of a water bottle which rests in a frame mounted cage and can be removed by a rider for drinking. Such an apparatus allows a rider to consume liquids without stopping and dismounting the bicycle, but the rider must let go of the handlebar with one hand to reach for and remove the water bottle from the cage. This may also require the rider to look down from the road and shift body positions, both reaching for and drinking from the water bottle.

SUMMARY OF THE INVENTION

The present invention is a liquid carrying apparatus for mounting on a bicycle from which a bicycle rider can draw liquid for refreshment. The preferred embodiment of the present invention includes a liquid holding tank, a connector for securing the tank to the bicycle frame, an elongate hose through which the bicycle rider can draw liquid from the tank, and a hose holder which releasably attaches an end of the hose to the handlebar of the bike.

The liquid holding tank in the preferred embodiment has three sides forming a triangular outline. The three sides are generally referred to as the top, the bottom and the back sides. The top side of the tank has a mouth and a cap for filling the tank with liquid. The connector is preferably attached to the back and bottom sides, and includes a clasp and two mounts.

The clasp is preferably joined to the back side of the tank by a pivot, thus making the clasp an articulated element. Alternatively, the clasp may be rigidly joined to the back side of the tank. The clasp is generally C-shaped with an outwardly facing opening.

A first mount is joined to the bottom of the tank, and in the preferred embodiment, a second mount is also joined to the bottom of the tank. The mounts have arcuate outwardly facing mounting surfaces. Each mount preferably has a slot between the mounting surface and the tank for accommodating a strap-like fastener. The strap-like fastener works in combination with the mounting surface to secure the tank to the bicycle.

The elongate hose of the present invention is operatively connected to the tank. Preferably, this would be accomplished by the hose passing through a hole in the tank cap and to the bottom of the interior of the tank so that all of the liquid can be drawn from the tank by sucking on the hose. The drinking end of the hose is positioned to allow the rider to draw liquid through the hose without dismounting the bicycle. In the preferred embodiment, this is accomplished using a hose holder. The hose holder grips the elongate hose near the drinking end and removably attaches to the handlebar of the bicycle. The hose holder preferably has a handle so that the bicycle rider can grip the holder and remove it, along with the hose, from the handlebar and draw liquid through the hose in any riding position. The body of the elongate hose preferably is attached to the bicycle frame. This may be accomplished using pre-formed resilient clips or wire ties or any other equivalent means.

It is an object of the present invention to provide an inexpensive apparatus for transporting liquid on a bicycle.

It is a further object of the invention to provide a liquid carrying apparatus that can be directly secured to a bicycle so that the apparatus does not come free when riding on a rough surface.

Yet another object of the invention is to provide a liquid carrying apparatus for use on a bicycle that minimizes the effects of the additional weight of the liquid by mounting the apparatus low on the bicycle frame.

Another object of the invention is to provide liquid to a bicycle rider without the rider being required to release the handlebars.

Yet another object of the invention is to provide liquid to a bicycle operator without the need for the operator to look down from the road to the liquid carrying apparatus.

It is a further object of the invention to provide a bicycle mounted liquid carrying apparatus that can be easily removed for cleaning or filling.

Another object of the invention is to provide a bicycle mounted liquid carrying apparatus that will fit on a variety of bicycle frames.

BRIEF DESCRIPTION OF THE DRAWINGS

FIG. 2 is an enlarged top view of an alternative embodiment of the liquid holding tank of the invention shown in FIG. 1;

FIG. 3 is a rear view of the liquid holding tank shown in FIG. 2;

FIG. 4 is a side view of the liquid holding tank shown in FIG. 2;

FIG. 5 is a front view of the liquid holding tank shown in FIG. 2;

FIG. 6 is a bottom view of the liquid holding tank shown in FIG. 2;

FIG. 7 is an enlarged side view of an alternative embodiment of the hose holder of the invention shown in FIG. 1;

FIG. 8 is an end view of the hose holder shown in FIG. 7;

FIG. 9 is a top view of the hose holder shown in FIG. 7;

FIG. 10 is an isometric view of the hose holder shown in FIG. 7;

FIG. 11 is a side view of the embodiment of the hose holder shown in FIG. 7, showing the hose of the present invention being gripped by the hose holder;

FIG. 12 is an enlarged isometric view of an alternative embodiment of the hose holder of the invention shown in FIG. 1, shown on about the same scale as in FIG. 10;

FIG. 13 is a side view of the embodiment of the hose holder shown in FIG. 12,

FIG. 14 is an enlarged isometric view of another alternative embodiment of the hose holder of the invention shown in FIG. 1, shown on about the same scale as in FIG. 10;

FIG. 15 is a side view of the embodiment of the hose holder shown in FIG. 14,

FIG. 16 is an isometric view of the yet another alternative embodiment of the hose holder of the invention shown in FIG. 1, shown on about the same scale as in FIG. 10;

FIG. 17 is a side view of the embodiment of the hose holder shown in FIG. 16,

FIG. 18 is an enlarged isometric view of part of the invention shown in FIG. 1, showing a clip used to hold the drinking hose to the bicycle frame; and FIG. 19 is an enlarged isometric view of one embodiment of the mount of the invention shown in FIG. 1, showing a portion of a bicycle frame member and how the mount docks with the frame member and is secured to it by a fastener.

DETAILED DESCRIPTION OF THE PREFERRED EMBODIMENTS

Figure 1:
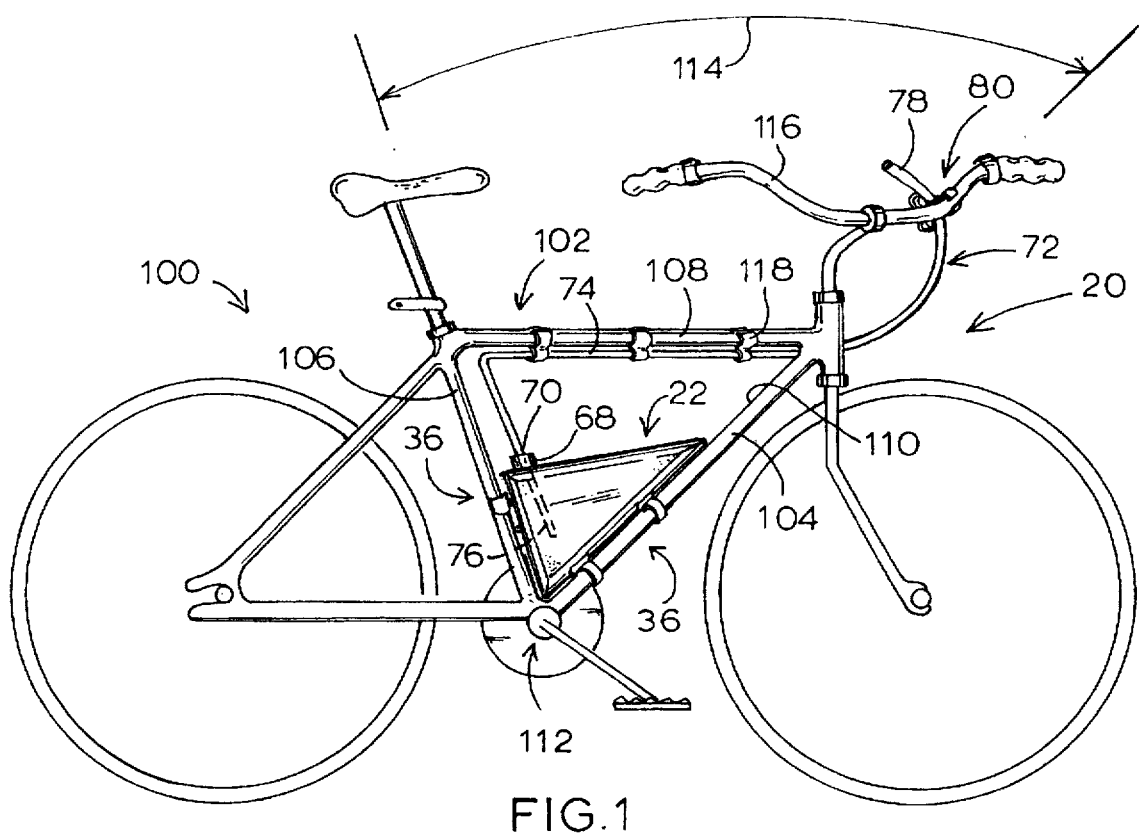
FIG. 1 shows one embodiment of the bicycle mounted liquid carrying apparatus of the present invention, shown in a self-supporting mounted position on a typical bicycle.

Referring to the drawings, the liquid carrying apparatus according to the present invention is shown generally at 20. Apparatus 20 includes a tank 22, also referred to as a container or liquid holding tank. Tank 22 includes multiple sides 24 that generally define a tank plane. Sides 24 include a top 26 having formed therein a mouth 28, a forward facing side 30 and a rearward facing side 32. Side 30 is also referred to as a down tube side, bottom side or bottom, and side 32 is also referred to as a seat tube side, back side or back.

Tank 22 further includes walls 34 interconnecting sides 24 to create a liquid holding interior. Walls 34 are preferably planar and substantially parallel to the tank plane defined by sides 24.

Tank 22 is fitted with a connector assembly indicated generally at 36, also referred to more simply as a connector. Connector 36 includes a mounting bracket 38 attached to and extending outwardly from back 32. Mounting bracket 38 includes one or more pivot points 40, preferably holes or axially aligned dimples that define an axis generally normal to the plane of tank 22. As shown best in FIG. 4, one such pivot point 40 is an upper pivot hole 42, and another such pivot point 40 is a lower pivot hole 44.

Connector 36 also includes a generally C-shaped clasp 46 having an outwardly facing opening indicated at 48. Clasp 46 is a semi-rigid, resilient clasp that forms a manually releasable, toolless fastener for directly anchoring tank 22 to a bicycle. Clasp 46 is pivoted to tank 22 by pivot 50. Pivot 50 can also be referred to as an articulating point, or as shown best in FIGS. 2, 4 and 6, a pin. Furthermore, pivot 50 could be protrusions that interact with the axially aligned dimples discussed above. Furthermore, the physical configuration of pivot points 40 and pivot 50 could be reversed, with the hole or dimple being formed as part of clasp 46, and the pin or protrusion being formed as part of mounting bracket 38.

Connector 36 also preferably includes one or more mounts 52 joined to tank 22. In the drawings, two such mounts 52 are shown, with a first mount being indicated at 52a and a second mount being indicated at 52b. However, it is possible to practice the invention using a single mount, and references to a first mount as opposed to a second mount refer interchangeably to items 52a and 52b.

Mount 52 includes a mounting surface 54 that is generally arcuate in shape and outwardly facing, as shown best in FIGS. 5, 6 and 19. Furthermore, mounting surface 54 is preferably spaced outwardly from tank 22 by a foundation 55 in which a slot 56 is defined between mounting surface 54 and tank 22. A restriction 58 may be formed in foundation 55, as seen best in FIGS. 4 and 19. Restriction 58 can be in many other forms, such as a protrusion, or can, simply be defined by the location of mounting surface 54. Slot 56 is also referred to as a gap. A restriction 58 can be formed in slot 56, as shown in FIG. 4.

Connector 36, and more specifically mounts 52, further include one or more manually releasable, toolless fasteners 60. The preferred such fastener 60 includes a strap 62 with hook material as indicated at 64 and loop material as indicated at 66. Accordingly, strap 62 is also referred to as a hook and loop strap. Furthermore, clasp 46 can be augmented with such a strap retained in a slot formed in mounting bracket 38, but this option is not shown.

Other elements of apparatus 20 include a cap 68 that is attachable to mount 28. Cap 68 has a hole 70 formed therein that receives a drinking hose 72. Hose 72 includes an elongated body indicated generally at 74, a first end 76 operatively connected to tank 22, more specifically to the lower-most portion of the interior of tank 22, and a second end 78 that is remote from first end 76 and that forms a drinking end.

Apparatus 20 further includes a hose holder 80 as shown in FIG. 1. Various embodiments of hose holder 80 are shown in FIGS. 7–17. Each such embodiment includes a generally C-shaped handlebar clasp 82, a handle 84 and a passage 86 through which hose 72 passes. Furthermore, with the exception of the embodiment shown in FIGS. 16 and 17, handle 84 defines a bounded region indicated generally at 88 that is sized for receiving one or more human fingers.

In the embodiments of hose holder 80 shown in FIGS. 7 through 15, it will be seen that passage 86 forms joinder structure interposed handle 84 and handlebar clasp 82. A first axis 84a is indicated for handle 84 along which a finger may be received. A second axis 82a is indicated for handlebar clasp 82, along which a handlebar may be received, and a third axis 86a is indicated for passage 86 along which hose 72 may be received. Second axis 82a is substantially parallel to first axis 84a and third axis 86a is substantially perpendicular to first axis 84a and second axis 82a. A separate geometrical center 82b, 84b, and 86b for clasp 82, handle 84, and passage 86, respectively, is indicated in FIGS. 10, 12, and 14. It will be seen that geometrical centers 82b, 84b, and 86b are aligned so an imaginary, straight line indicated at 90, extends generally through geometrical centers 82b, 84b, and 86b.

The present invention is designed for use on a typical bicycle, as shown in FIG. 1 at 100. Bicycle 100 has a frame 102 including a generally diagonal forward sloping frame member 104 referred to as a down tube, a generally vertical frame member 106 referred to as a seat tube, and a substantially horizontal frame member 108 referred to as a top tube. These frame members are operatively interconnected to form a triangle on a typical bicycle frame.

For ease of description, the lowest point of this triangle when the bicycle is in a riding position, is referred to as a base 112 of frame 102. Down tube 104 and seat tube 106 are operatively interconnected adjacent base 112 of frame 112. Accordingly, base 112 is also referred to as a region of operative interconnection. This operative interconnection may take the form of down tube 104 and seat tube 106 both being welded to a bottom bracket 114. It may also take the form of down tube 104 and seat tube 106 being welded or adhered directly to one another.

Seat tube 106 and down tube 104 form a pair of frame members including a first frame member and a second frame member. Either seat tube 106 or down tube 104 may be the first frame member, interchangeably.

Down tube 104 and seat tube 106 extend away from region of operative interconnection 112 so as to form an angle of operative interconnection 114.

Bicycle 100 also has a handlebar 116 by which bicycle 100 can be steered. Handlebar 116 provides multiple positions whereon clasp 82 can be attached.

From the foregoing identification of the component parts of the present invention, numerous interrelationships of these part are encompassed by the invention. For example, the invention includes liquid carrying apparatus 20 with liquid holding tank 22 having frame-member-confronting sides 30 and 32 that are designed to be directly anchored to frame members 104 and 106 of bicycle 100, preferably by being positively anchored to frame 102 adjacent region of operative interconnection 112.

Apparatus 20 can further include mount 52 joined to tank 22, mount 52 including arcuate outwardly facing mounting surface 54 oriented to dock with one of frame members 104 or 106. Manually releasable, toolless fastener 60 with mounting surface 54 whereby mounting surface 54 can be directly and positively anchored to one of frame members 104 or 106. Arcuate mounting surface 54 preferably defines slot 56 between mounting surface 54 and tank 22, and fastener 60 extends through and is retained by slot 56.

Furthermore, fastener 60 is preferably strap 62 that releasably encircles first frame member 104 or 106.

Strap 62 has first end 64 with exposed hook material and second end 66 with exposed loop material so that first end 64 is attachable to second end 66 by mating the hook material to the loop material.

Two or more mounts 52 can be used as well. For instance, first mount 52a and second mount 52b can be joined to tank 22, with second mount 52b distant from first mount 52a.

Manually releasable, toolless clasp 46 joined to tank 22 for directly anchoring tank 22 to second frame member 104 or 106, with clasp 46 pivoted to tank 22. Tank 22 can further include mounting bracket 38 for receiving clasp 46, with mounting bracket 38 including two or more holes 40 formed therein, and clasp 46 can be pivoted to tank 22 by pin 50 that rotatably interfits with a selected one of holes 40 in bracket 38. Clasp 46 is generally C-shaped with outwardly facing opening 48. Tank 22 preferably defines a plane, and clasp 46 is preferably pivoted to tank 22 for relative rotation about an axis generally normal to the plane of tank 22.

Apparatus 20 can also be described as including a liquid holding tank 22 designed to be directly anchored to frame 102 and shaped so as to nest in be self supporting in a mounted position, as shown in FIG. 1, selectively operable connector 36 secures tank 22 in the mounted position.

Another way to describe apparatus 20 is to define it as including liquid holding tank 22 designed to be mounted adjacent base 112 of frame 102. Elongate hose 72, having first end 76 operatively connected to tank 22 and remote second end 78, is gripped by hose holder 80 adjacent second end 78. Holder 80 is removably attached to bicycle 100 and readily accessible to a rider's hand.

Described still differently, apparatus 20 includes liquid holding tank 22 having free standing rigidity and having sides 24 which are positively, toollessly removably anchorable to frame 102.

Numerous other combinations and subcombinations of the components and steps described above are also possible. Furthermore, while specific embodiments of the invention have been disclosed, variations and modifications are possible without departing from the spirit and scope of the invention.

I claim:

1. A liquid carrying apparatus for use on a bicycle frame, the frame having a base and first and second frame members operatively interconnected adjacent the base, the apparatus comprising:

a liquid holding tank including frame-member-confronting sides;

an arcuate outwardly facing mounting surface oriented to dock with the first frame member;

a slot defined between the mounting surface and the tank, and enclosed so that the tank is watertight in the region of the slot;

a strap that extends through the slot whereby the mounting surface can be directly and positively anchored to the first frame member by releasably encircling the first frame member with the strap; and a manually releasable, toolless, resilient C-shaped clasp pivotally joined to the tank for directly anchoring the tank to one of the frame members; wherein:

the tank further includes a mounting bracket for receiving the clasp;

the mounting bracket includes two or more holes formed therein; and the clasp is pivoted to the tank by a pin that rotatably interfits with a selected one of the holes in the bracket.

2. The apparatus of claim 1, wherein the frame members comprise a down tube and a seat tube.

3. The apparatus of claim 1, which further includes a foundation interposed between the tank and the mounting surface so that the mounting surface is held at least slightly away from the tank and wherein the slot is formed through the foundation.

4. The apparatus of claim 1, wherein the strap has a first end with exposed hook material and a second end with exposed loop material, and the first end is attachable to the second end by mating the hook material to the loop material.

5. The apparatus of claim 3, which further includes a second arcuate outwardly facing mounting surface joined to the tank distant from the first mounting surface, the second mounting surface being oriented to dock with the first frame member.

6. A liquid carrying apparatus for use on a bicycle frame, the frame having a base and first and second frame members operatively interconnected adjacent the base, the apparatus comprising:

a liquid holding tank including frame-member-confronting sides; and a manually releasable, toolless, resilient, C-shaped clasp pivotally joined to the tank for directly anchoring the tank to one of the frame members. wherein:

the tank further includes a mounting bracket for receiving the clasp:

the mounting bracket includes two or more holes formed therein; and the clasp is pivoted to the tank by a pin that rotatably interfits with a selected one of the holes in the bracket.

7. The apparatus of claim 6, wherein the clasp has an outwardly facing opening.

8. The apparatus of claim 6, wherein the tank generally defines a plane, and wherein the clasp is pivoted to the tank for relative rotation about an axis generally normal to the plane of the tank.

9. A liquid carrying apparatus for use on a bicycle frame comprising:

a liquid holding tank; and a selectively operable, pivoted, toolless, resilient C-shaped clasp for at least partially securing the tank in a mounted position within a bicycle frame; wherein:

the tank further includes a mounting bracket for receiving the clasp;

the mounting bracket includes two or more holes formed therein; and the clasp is pivoted to the tank by a pin that rotatable interfits with a selected one of the holes in the bracket.

10. A liquid carrying apparatus for use on a bicycle frame comprising a liquid holding tank having free standing rigidity and having sides which are positively, toollessly removably anchorable to the frame by a pivoted, tooless, resilient C-shaped clasp; wherein:

the tank further includes a mounting bracket for receiving the clasp;

the mounting bracket includes two or more holes formed therein; and the clasp is pivoted to the tank by a pin that rotatable interfits with a selected one of the holes in the bracket.

11. A liquid carrying apparatus and handlebar for use on a bicycle, the apparatus comprising:

a liquid holding tank for mounting to the bicycle;

an elongate hose having a first end operatively connected to the tank and a remote second end;

a handlebar for mounting to the bicycle; and a hose holder that grips the hose adjacent its said second end, the holder having a user manipulable handle sized to receive and encircle a finger of a rider's hand, and a handlebar clasp which is resiliently, removably attached to the handlebar; wherein:

the tank further includes a mounting bracket for receiving the clasp;

the mounting bracket includes two or more holes formed therein; and the clasp is pivoted to the tank by a pin that rotatably interfits with a selected one of the holes in the bracket.

12. A liquid carrying apparatus for use on a bicycle frame, the frame having a base and first and second frame members operatively interconnected adjacent the base, to define an angle of interconnection, the apparatus comprising:

a liquid holding tank including angularly intersecting sides; and mounting structure including an articulated, semi-rigid clasp which cooperates with the intersecting sides and the tank to accommodate variations in the angle of interconnection; wherein:

the tank further includes a mounting bracket for receiving the clasp;

the mounting bracket includes two or more holes formed therein; and the clasp is pivoted to the tank by a pin that rotatably interfits with a selected one of the holes in the bracket.

13. The apparatus of claim 12, wherein the first frame member is a down tube and the second frame member is a seat tube.

14. The apparatus of claim 12, wherein the articulated element takes the form of a clasp which is manually and toollessly releasable for directly anchoring the tank to one of the frame members.

15. The apparatus of claim 12, futher including:

a mount joined to the tank including an arcuate outwardly facing mounting surface oriented to dock with the first frame member; and a manually releasable, tooless fastener in combination with the mounting surface whereby the mounting surface can be directly and positively anchored to the first frame member.

16. The apparatus of claim 15, wherein:

the arcuate mounting surface defines a slot between the mounting surface and the tank; and the fastener is a strap that extends through and is retained by the slot, and that releasably encircles the first frame member.

17. A liquid carrying apparatus for use on a bicycle, the bicycle having a handlebar, the apparatus comprising:

a liquid holding tank for mounting to the bicycle;

an elongate hose having a first end operatively connected to the tank and a remote second end;

a hose holder that grips the hose adjacent its said second end, the holder having a user manipulable handle sized to receive and encircle a finger of a rider's hand, a handlebar clasp which is oriented so as to be removably attachable to the handlebar, and joinder structure interposed between the handle and the handlebar clasp, the joinder structure having a passage formed therein for receiving the second end of the hose.

18. The apparatus of claim 17 wherein:

the user manipulable handle is oriented so as to receive a finger of a rider's hand along a first axis;

the handlebar clasp is oriented so as to receive the handlebar along a second axis substantially parallel to the first axis; and the joinder structure is oriented so as to receive the hose along a third axis substantially perpendicular to the first axis and the second axis.

19. The apparatus of claim 18 wherein the user manipulable handle, handlebar clasp and joinder structure each include a separate geometrical center, and are oriented relative to one another so that an imaginary straight line may extend through all three geometrical centers.

20. The apparatus of claim 17 wherein the user manipulable handle, handlebar clasp and joinder structure each include a separate geometrical center, and are oriented relative to one another so that an imaginary straight line may extend through all three geometrical centers.

* * * * *